Figure 1:
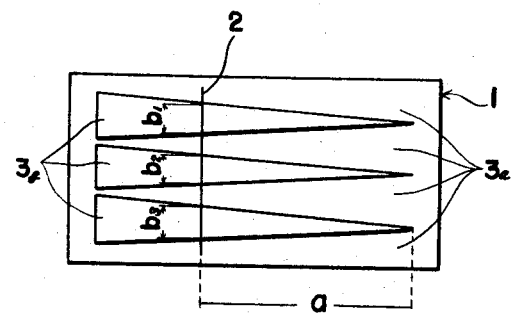

July 30, 1968  REO MORI ET AL  3,394,628
LIGHT MEASURING APPARATUS
Filed Aug. 28, 1963  2 Sheets-Sheet 1

Reo Mori
INVENTOR.

BY George B. Oxyarotk
Attorney

United States Patent Office 3,394,628
Patented July 30, 1968

3,394,628
LIGHT MEASURING APPARATUS
Reo Mori, Tokyo, and Hideo Osawa, Yokohama-shi, Japan, assignors to Tokyo Shibaura Electric Co. Ltd., Kawasaki-shi, Japan, a corporation of Japan
Filed Aug. 28, 1963, Ser. No. 305,134
Claims priority, application Japan, Aug. 31, 1962, 37/37,641
3 Claims. (Cl. 88—14)

This invention relates to a light measuring apparatus utilizing a photometric comb as the attenuating element and is suitable for use in recording spectrophotometers and the like, and more particularly to a light measuring apparatus wherein a combination of spherical optical elements and cylindrical optical elements is utilized to illuminate the surface of the photometric comb.

By way of example this invention will be explained in the following with reference to a recording spectrophotometer. While there have been used various types of light measuring system in the spectrophotometer of the type above referred to it is well recognized in the art that the light measuring system of the optical balance type including two light paths and one optical receiver gives the most reliable result. In this light measuring system lights reflected from or passed through a reference plate and a sample plate are compared by a single light receiver and upon occurrence of a difference between two lights the position of an optical attenuating element located in the path of the light which illuminates the reference plate is adjusted to obtain the reflectance (or transmittance) from the adjusted position of said attenuating element. In this system the most important element that determines the accuracy of the measured value is the optical attenuating element. Heretofore, polarizers, optical wedges and photometric combs have been used as the attenuating element. Among these elements, the relation between the amount of movement or the angle of rotation and the ratio of attenuation of the polarizer is not linear so that it is necessary to employ such mechanism as a cam in order to obtain a measured value of linear scale which induces an error in the measured value. Furthermore with the optical wedge it is not possible to provide accurate spectral measurement owing to its spectral selectivity. On the other hand the photometric comb is superior to the above mentioned two elements in that it is easy to manufacture a photometric comb having linear relation between its position and the ratio of attenuation and that it has no spectral selectivity. However, in the prior devices there were opportunities to introduce errors in the measured value by many causes involving uneven illumination of the slits, unequal width of the slits, defects of the slits, dust deposited on the slits and the like since in these prior devices the image of the slits was focused on the surface of the photometric comb. Accordingly the spectrophotometers utilizing the photometric combs were used only in the range of infrared rays in which it is difficult to decrease the light intensity by polarizers, and they have been scarcely utilized in the visible range in which high degree of accuracy is desired.

It is the object of this invention to provide a light measuring device utilizing a photometric comb as the attenuating element which can obviate the above mentioned disadvantages, while maintaining its inherent advantages and yet can provide more accurate measurement than prior devices utilizing the combination of a polarizer and a cam mechanism.

Figure 2:
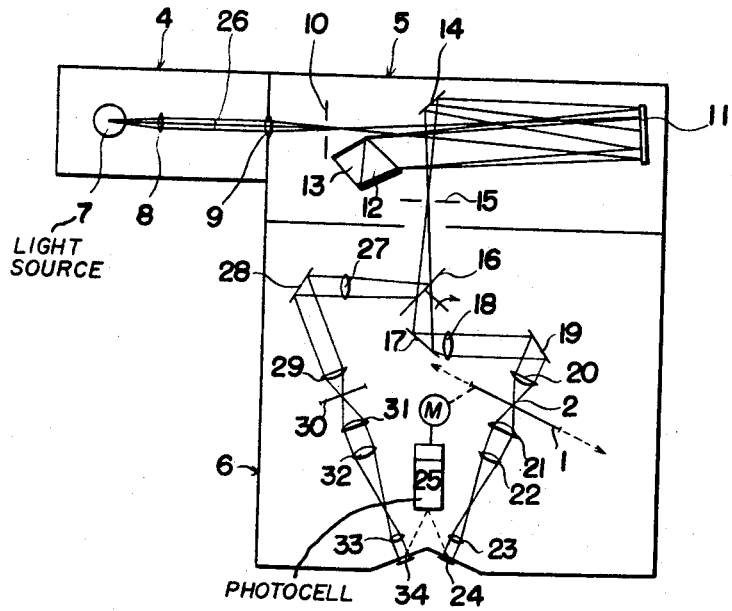
Figure 3:
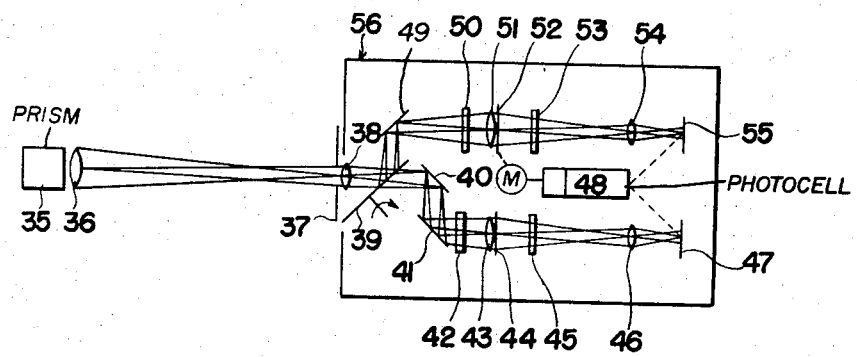
Figure 4:
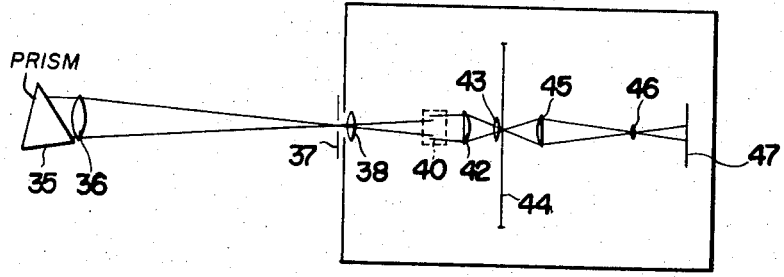

Further objects and advantages of the present invention will become apparent and this invention will be better understood from the following description, reference being made to the accompanying drawings. The features of the novelty which characterize the invention are set forth in the claims annexed and forming part of this specification. In the drawings, FIG. 1 shows a front view of one example of a photometric comb;
FIG. 2 shows a plan view of an optical system of a recording spectrophotometer embodying this invention; and
FIGS. 3 and 4 show another embodiment of this invention wherein FIG. 3 shows a vertical view of the optical system in the light measuring device and FIG. 4 shows a plan view of the optical system in the path of the reference light.

Referring now to FIG. 1 of the accompanying drawings, a photometric comb 1 has a number of slotted windows $3b$ which have the sides $3a$, the width of the window decreasing from its one end toward the other end along the direction of insertion. The comb 1 is disposed to interrupt the light path which has a rectilinear cross section and extends in a direction perpendicular to the plane of the windows $3b$ thereof. In constructing the optical path it is essential to make the ratio of transmission of the light flux along the light path which passes through the photometric comb to exactly be proportional to the length $a$ along which the photometric comb 1 is inserted in a direction perpendicular to the light path.

In order to satisfy this condition, the configuration of the sides $3a$ of the photometric comb 1 should be made such that the total sum $\Sigma bi$ (in the case of FIG. 1, $i=1, 2, 3$) of the length of light flux which remains non-interrupted by said sides should be exactly proportional to the length $a$ along which the photometric comb 1 is inserted. This can be attained relatively easily by machining the photometric comb to high accuracy. It is also essential that the width of the section 2 of the light path impinging upon the photometric comb 1 should be sufficiently thin and that the distribution of the luminous flux in the longitudinal direction of the section 2 of the light path should be sufficiently uniform. However it is difficult to make uniform the distribution of luminous flux in the longitudinal direction due to unequal width of the slit and non-uniform intensity of slit illumination if the image of the exit slit is focussed on the plane of the photometric comb as heretofore has been the practice. On the other hand in order to make uniform the luminous flux distribution in the longitudinal direction the image formed on the section 2 of the light path may be soft focussed, then it may become impossible to make thin the section 2 of the light path.

According to this invention the above mentioned difficulties are overcome by utilizing a combination of a spherical optical element such as a spherical lens or a spherical mirror and a cylindrical optical element such as a cylindrical lens or a cylindrical mirror so as to focus the image of the exit slit on the photometric comb in the direction of insertion of the photometric comb and to focus the image of uniform light flux in the perpendicular direction to said direction. Hereafter, the direction of insertion or movement of the photometric comb is called horizontal direction, and the direction perpendicular to that is called vertical direction. Thus it becomes possible to make nearly uniform in the vertical direction the luminous flux distribution of a rectilinear light image on the photometric comb and further to make sufficiently thin the width of the light image thereby to assure photometry at extremely high accuracy notwithstanding irregularity in the width of the slit of the monochromator due to the presence of defects or dust.

An example of a recording spectrophotometer embodying this invention will now be described in detail with reference to FIG. 2. The spectrophotometer shown in FIG. 2 comprises a combination of a light measuring device constructed in accordance with this invention and a Littrow type monochromator with a mirror, said spectrophotometer including three sections; a light source 4, a monochromator 5 and a light measuring device 6.

The light source section 4 includes a light source 7 and two condenser lenses 8 and 9 adapted to illuminate an entrance slit 10 of the monochromator section 5 with the light emitted from the light source 7.

While in FIG. 2 the monochromator section 5 is shown as a single monochromator for the sake of brevity, it is to be understood that in actual devices a double monochromator is to be used to improve its ability. More particularly, behind said entrance slit 10 there is provided a collimator concave mirror 11 to reflect the light which has passed through the entrance slit 10. A prism 12 is provided to transmit the light reflected from the collimator concave mirror 11 and an inclined Littrow mirror 13 is provided on the back side of the prism 12. A light beam transmitted through the prism 12 is directed by the Littrow mirror 13 again through the portions of the prism 12 and the collimator reflecting mirror which are different from the portions through which the light has been transmitted and reflected previously and thence reflected by a plan mirror 14. An exit slit 15 is provided in front of the plane mirror 14 so as to permit a selected monochromatic light whose wavelength is determined by the angle of inclination of said Littrow mirror 13 when the light reflected by the plane mirror 14 passes through the exit slit 15.

In the light measuring section 6, there is mounted a rotating sector mirror 16 in front of the exit slit 15 to direct the monochromatic light which has passed through the exit slit 15 alternately to the reference light path and the sample light path by the action of transmission and reflection of the rotating sector mirror 16. The reference light path includes a plane mirror 17, a spherical lens 18, a plane mirror 19, a cylindrical lens 20, the photometric comb 1 described above, a cylindrical lens 21, spherical lenses 22 and 23 and a reference plate 24 which are arranged in the order mentioned between the rotating sector mirror 16 and a photo electric light receiver 25. The spherical lens 18 is designed to have a focal length equal to the distance between the lens 18 and the exit slit 15, it being understood that the distance between the position of the section 2 of the light path on the photometric comb 1 and the spherical lens 18 is made to coincide with said focal length, whereas the cylindrical lens 20 is designed to have a focal length shorter than that of the spherical lens 18 and the distance between the cylindrical lens 20 and the position of the section 2 of the light path on the photometric comb 1 is made equal to this focal length. On the other hand the sample light path includes a spherical lens 27, a plane mirror 28, a cylindrical lens 29, a compensating comb 30, a cylindrical lens 31, spherical lenses 32 and 33 and a sample plate 34 which are arranged in the order mentioned between the rotating sector mirror 16 and the photoelectric receiver 25.

Thus, when the light beam is transmitted through the transparent section of the rotating sector mirror 16, it is reflected by the plane mirror 17, converted into parallel light beam by the spherical lens 18 and is then reflected by the plane mirror 19. The reflected light beam is focused to form an image in the form of a straight line on the surface of the photometric comb 1 after passing through the cylindrical lens 20. In this way the image of the exit slit 15 is focussed by the spherical lens 18 and the cylindrical lens 20 at the position of the section 2 of the light path on the photometric comb in the horizontal direction. In other words, the section 2 of the light path on the photometric comb 1 is made to be conjugate with respect to the entrance slit 10 and the light source 7 in the horizontal direction by the action of monochromator section 5 and the light source section 4. Also since the cylindrical lens 20 does not change the direction of the light beam in the vertical direction, the collimator concave mirror 11 and the spherical lens 18 form the image of the Littrow mirror 13 on the surface of the photometric comb 1 in the vertical direction. Thus the section 2 of the light path on the photometric comb 1 is conjugate with the Littrow mirror 13 in the vertical direction. Furthermore this section is conjugate with a plane 26 between the condenser lenses 8 and 9. This plane 26 is spaced from the condenser lens 8 by a distance equal to its focal length and is also spaced from the condenser lens 9 by a distance equal to its focal length so as to improve uniformity in the distribution of illumination within the effective radus. Therefore by making the radii of the condenser lenses 8 and 9 sufficiently large, vignetting may be prevented, and therefore it is possible to decrease non-uniformity in the distribution of luminous flux in the vertical direction of the section 2 of the light path on the photometric comb 1. In the horizontal direction, the width of the image of the exit slit can be made sufficiently thin by proper selection of the ratio between the distance between slit 15 and the spherical lens 18 and between the cylindrical lens 20 and the image on the photometric comb 1. Accordingly it is possible to make the length of insertion of the photometric comb 1 exactly proportional to the transmitted light beam.

The light beams transmitted through the photometric comb 1 are converted into parallel rays in the horizontal direction by the action of the cylindrical lens 21 which is equivalent to the cylindrical lens 20 and disposed symmetrical thereto and is then used to illuminate the reference plate 24 through spherical lenses 22 and 23. This lens 21 has a focal length equal to the distance between the lens 20 and the photometric comb.

The optional system of the sample light path is identical with the above described optical system of the reference light path. More particularly, spherical lens 27, spherical lenses 32, 33, cylindrical lenses 29, 31 and plane mirror 28 respectively correspond to the spherical lens 18, lenses 22, 23, cylindrical spherical lenses 20, 21 and plane mirror 19. The compensating comb 30 is provided for the purpose of maintaining the light path in symmetrical relation relative to the photometric comb 1 and also to compensate the measured photometric value of 100%. Thus, similar to the reference light path above described, in the sample light path also the sample plate 34 is illuminated while the light is reflected by the rotating sector mirror 16.

In this way the reference plate 24 and the sample plate 34 are alternately illuminated and light beams reflected by these plates are received by a single photoelectric light receiver 25, the alternating current output thereof being utilized to adjust the position of the photometric comb 1 through a conventional means such as a motor M in circuit with the photolectric light receiver and having a mechanical connection to the comb, all of which is conventional as shown by way of example in the Pliskin Patent 3,013,470, issued Dec. 19, 1961, so as to maintain the balancing between light beams in said two paths and to know the photometric value of the sample plate from the position of the photometric comb 1.

FIGS. 3 and 4 show another embodiment of the recording spectrophotometer. In this embodiment a suitable mechanism is employed between the light source section and the prism of the monochromator section to cause the light beam from the light source to impinge upon the prism. In front of a prism 35 is disposed a telescope (collimator) lens 36 and an exit slit 37 is located facing thereto. The monochromatic light beam which has passed through the prism 35, the lens 36 and the exit slit 37 are conveyed to the light measuring section 56 which corresponds to the light measuring section 6 in the preceding embodiment.

In the light measuring section 56, a spherical lens 38 is provided adjacent the exit slit 37 and a rotating sector mirror 39 is situated behind the spherical lens 38. The monochromatic light beam which has passed through the exit slit 37 and the spherical lens 38 are directed alternately into a reference light path and a sample light path. The reference light path comprises plane mirrors 40 and 41, a cylindrical lens 42, a lens 43, a photometric comb 44, a cylindrical lens 45, a lens 46 and a reference plate 47 which are arranged in the order mentioned above between the rotating sector mirror 39 and a photoelectric light receiver 48, whereas the sample light path comprises a plane mirror 49, a cylindrical lens 50, a lens 51, a compensating comb 52, a cylindrical lens 53, a lens 54 and a sample plate 55 which are arranged in the order mentioned above between the rotating sector mirror 39 and the photoelectric light receiver 48.

Like the previous embodiment, as the reference and sample light paths are equivalent, only the former path will be described in detail. Light beam directed to this path illuminates the photometric comb through the spherical lens 38, plane mirrors 40, 41, the cylindrical lens 42 and the lens 43 so as to focus the image of the telescope lens 36 on the photometric comb 44 in the vertical direction. In this case the cylindrical lens 42 acts to focus the image of the exit slit 37 on the photometric comb 44 only in the vertical direction. As a result, on the surface of the photometric comb 44 there are formed the image of the telescope lens 36 in the vertical direction and the image of the exit slit 37 in the horizontal direction whereby to form a thin rectilinear image having uniform width in the vertical direction. The lens 43 focusses the image of the exit slit 37 at the position of the lens 46 and the cylindrical lens 45, which is identical with the cylindrical lens 42, serves to compensate astigmatism of the light beam. The lens 46 serves to focus the image of the lens 43 on the reference plate 47.

The cylindrical lens 50, lens 51, cylindrical lens 53 and lens 54 in the sample light path correspond respectively to the cylindrical lens 42, lens 43, cylindrical lens 45 and lens 46 in the reference light path. The compensating comb 52 functions to maintain symmetry between these two light paths and also to compensate the photometric value. Therefore it is also able to focus an image on the compensating comb 52 in the sample light path which is similar to that of the reference light path. Thus the sample plate 55 is illuminated in the same manner as in the reference light path.

In this way light beams reflected from the reference plate 47 and the sample plate 55 are alternately received by the photoelectric light receiver 48 so that by adjusting the position of the photoelectric comb 44, the photometric value of the sample can be determined from this position just in the same manner as in the previous embodiment.

This embodiment is different from that shown in FIG. 2 in that this embodiment utilizes a relay lens system without forming parallel light beams. However the fundamental concept of using a pair of cylindrical lenses in each light path including a spherical lens system so as to focus an image of the prism of the monochromator section on the photometric comb in the vertical direction and an image of the exit slit in the horizontal direction whereby to form a rectilinear image which is sufficiently narrow in the transverse direction and of uniform light flux distribution in the longitudinal direction is the same for both embodiments.

While in the above described embodiments spherical lenses and cylindrical lenses have been shown as the image focussing elements, these lenses may be replaced respectively by spherical mirrors and cylindrical mirrors to attain the same object. As stated above since the compensating combs 30 and 52 are provided for the purpose of compensating asymmetry in the reference and sample light paths, they can be substituted by the normal optical wedges.

As will be obvious from the above description, according to this invention a spherical optical element such as a spherical lens or a spherical mirror and a cylindrical optical element such as a cylindrical lens or a cylindrical mirror are incorporated into an optical system so as to focus the image of an exit slit having sufficiently narrow width on a photometric comb in the horizontal direction and also to focus in the vertical direction an image of a surface of a uniformly illuminated portion of a light source section. Thus this invention utilizes the photometric comb as the attenuating element to effect measurement of high accuracy.

While the invention has been explained by describing particular embodiments thereof, it will be apparent that improvements and modifications may be made without departing from the scope of the invention as defined in the appended claims.

What is claimed is:

1. A light measuring apparatus comprising a light source, an optical system which consists of at least one lens and including a defined plane of uniform luminous flux distribution illuminating a slit by the light emitted from said light source, a rotating sector mirror to direct a light beam which has passed through said slit alternately to a reference light path and to a sample light path arranged along side said reference light path, a photometric comb disposed in said reference light path and movable at right angles thereto; a first lens system located in front of said comb and including a spherical lens and a cylindrical lens, said spherical lens being arranged to form a line image of said defined plane on said photometric comb, said cylindrical lens being arranged in combination with said spherical lens to focus the image of said slit on said photometric comb along a direction of movement of said photometric comb so that the cross section of said reference light path on said photometric comb has a thin rectilinear shape with uniform distribution of luminous flux independent of non-uniformity of illumination of said slit; a second lens system located behind said comb and including a cylindrical lens which passes the light received from said comb converted into parallel rays, and spherical lens means to concentrate the image received from said cylindrical lens on a reference space, an optical system defining said sample light path including a compensating optical comb unit therein positioned in the same manner as said photometric comb in said reference light path, third and fourth lens systems provided in said sample light path corresponding to the first and second lens systems in said reference light path and a sample space provided in said sample light path corresponding to said reference space in said reference light path, a single photoelectric light receiver for alternately receiving light beams from said reference and sample spaces located in said reference and sample light paths, and means responsive to the output of said photoelectric light receiver to control the position of said photometric comb.

2. The light measuring apparatus according to clam 1 wherein said first lens system essentially comprises a spherical lens disposed in the light path between said slit and said photometric comb and having a focal length equal to a half of the distance between said slit and said photometric comb and a cylindrical lens situated in front of said photometric comb and having a focal length equal to the distance between said cylindrical lens and said photometric comb.

3. The light measuring apparatus according to claim 1 wherein the second lens system essentially comprises a cylindrical lens situated behind said photometric comb and having a focal length equal to the distance between said cylindrical lens and said photometric comb.

References Cited

UNITED STATES PATENTS

| | | | |
|---|---|---|---|
| 3,013,470 | 12/1961 | Pliskin | 88—14 |
| 3,191,488 | 6/1965 | Eisner | 88—14 |

JEWELL H. PEDERSEN, *Primary Examiner.*

F. L. EVANS, *Assistant Examiner.*